United States Patent [19]

Giuseppe et al.

[11] Patent Number: 5,464,119
[45] Date of Patent: Nov. 7, 1995

[54] AUTOMATIC MACHINE FOR DISPENSING AN ICE-CREAM PORTION

[75] Inventors: Caccia Giuseppe, Romentino; Airoldi Luigi, Galliate, both of Italy

[73] Assignee: Universal Ice Cream Machines S.r.l., Italy

[21] Appl. No.: 255,639

[22] Filed: Jun. 9, 1994

[30] Foreign Application Priority Data

Jun. 10, 1993 [IT] Italy ............... MI93A1231

[51] Int. Cl.$^6$ ............... B65H 9/00
[52] U.S. Cl. ............... 221/156; 221/173; 221/224; 221/234; 221/239; 221/265; 221/266
[58] Field of Search ............... 221/171, 173, 221/155, 156, 221, 224, 233, 234, 239, 263, 264, 265, 266, 277

[56] References Cited

U.S. PATENT DOCUMENTS

| | | | |
|---|---|---|---|
| 1,041,192 | 10/1912 | Tarbell | 221/155 |
| 1,979,089 | 10/1934 | Adams | 221/221 X |
| 2,193,942 | 3/1940 | Shackelford | 221/263 X |
| 2,624,647 | 1/1953 | Lawson | 221/221 |
| 3,083,868 | 4/1963 | Mueller | 221/221 X |
| 4,193,512 | 3/1980 | Buxton et al. | 221/266 X |

FOREIGN PATENT DOCUMENTS

| | | | |
|---|---|---|---|
| 330252 | 8/1989 | European Pat. Off. | 13/10 |
| 379238 | 7/1990 | European Pat. Off. | 9/28 |
| 1215542 | 4/1966 | Germany | 221/221 X |
| 1253085 | 10/1989 | Japan | 221/155 X |
| 2187167 | 9/1987 | United Kingdom | 221/265 X |

*Primary Examiner*—William E. Terrell
*Assistant Examiner*—Dean A. Reichard
*Attorney, Agent, or Firm*—Henderson & Sturm

[57] ABSTRACT

An automatic machine for dispensing an ice cream portion comprises, in combination, a dispenser (10) for dispensing cones (18) or the like in an inverted position, and a seat (20) arranged to receive the cone (18) in an upright position and to convey it to an ice cream delivery mouth (27). Between the cone dispenser (10) and the seat (20) there is provided a cone (18) overturning and feed device (12) arranged to receive a cone (18) in an inverted position, to overturn it into an upright position and to feed it automatically into the seat (20).

4 Claims, 3 Drawing Sheets

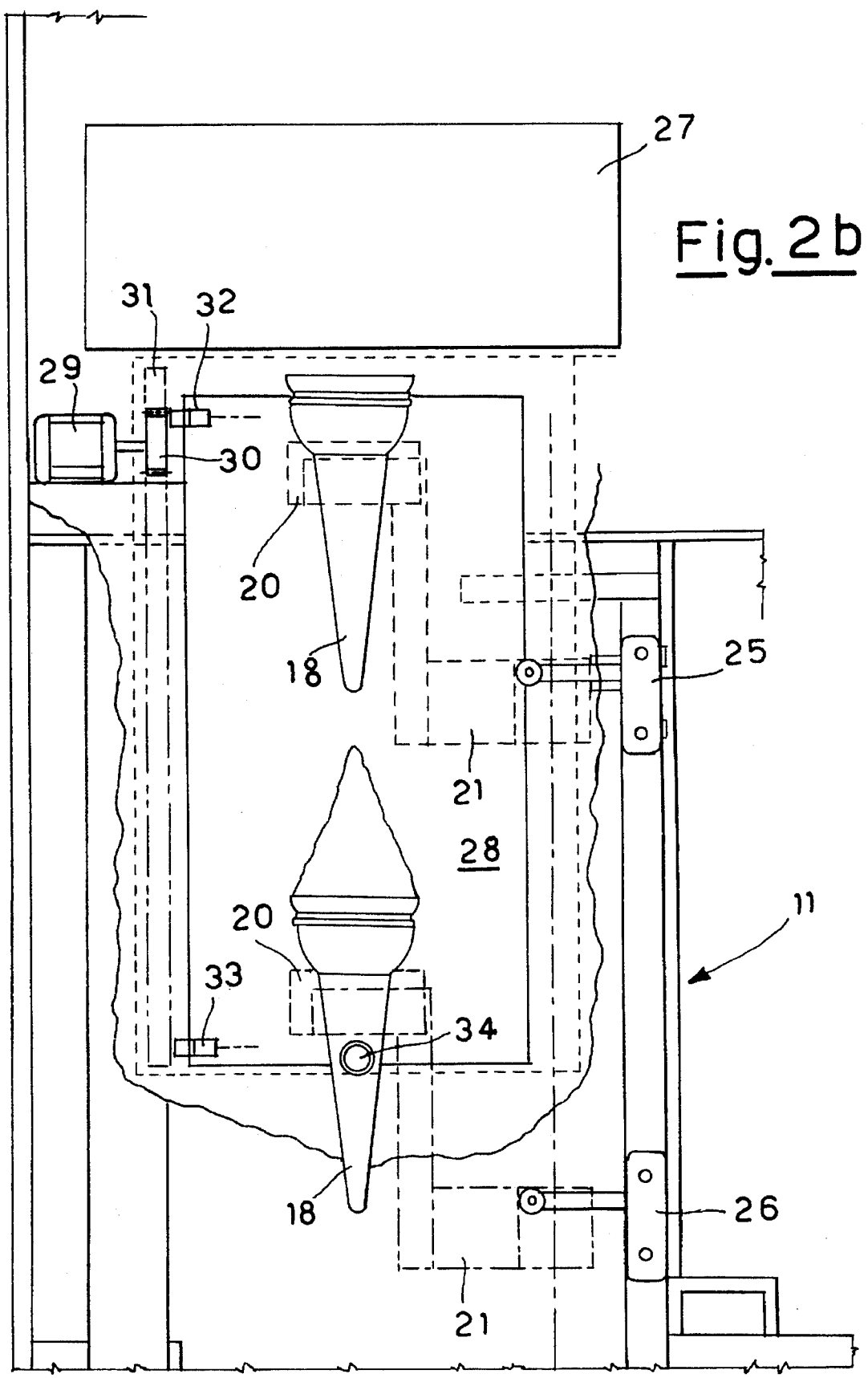

AUTOMATIC MACHINE FOR DISPENSING AN ICE-CREAM PORTION

BACKGROUND OF THE INVENTION

1. Field of the Invention

This invention relates to a completely automatic machine of the coin or token type for dispensing an ice cream portion, with which a dispenser for dispensing cones or like containers to contain the product is associated.

2. Discussion of Background and/or Material Information

A semi-automatic coin or token machine for dispensing an ice cream portion is described, for example, in EP-330252.

A cone dispenser which can be associated with such a machine is described, for example, in EP-A-379238.

For a complete understanding of the present invention, the description and drawings of EP-330252 and EP-A-379238 are to be considered as forming part of the present patent application, and are incorporated in their entirety by reference thereto herein, but are not reproduced for simplicity of description.

As is well known to the expert of the art, coin or token operated machines for dispensing an ice cream portion, i.e., so-called soft machines, are known in which the customer manually withdraws the cone from a dispenser associated with the machine and places it in a seat in the machine, which then conveys the cone to an ice cream delivery mouth. After filling, the cone is presented to the customer who removes it.

Machines of this type have the drawback due at least in part to the fact that the customer has to handle the cone. Such handling by the customer is not only inconvenient, but can also lead to mistakes in carrying out the required sequence of operations because the manner of using the machine may not be immediately obvious to the customer. Also, handling the cone by the customer is also questionable from a hygienic viewpoint.

SUMMARY OF THE INVENTION

An object of the present invention is to obviate the drawbacks of the known prior art by providing a machine for dispensing an ice cream portion associated with a cone dispenser, in which the entire cycle occurs automatically without any manual action by the customer, except for inserting the coin or token and withdrawing the cone containing ice cream.

The object of the present invention is attained by a machine having the characteristics defined in the accompanying claims.

BRIEF DESCRIPTION OF THE DRAWINGS

The structural and functional characteristics of the invention and its advantages over the known art will be more apparent from an examination of the following description, given with reference to the accompanying drawings, which show one embodiment of a machine incorporating the principles of the invention.

FIGS. 2a and 2b together show the ice cream machine in its various operating stages.

DETAILED DESCRIPTION

Figure 1:
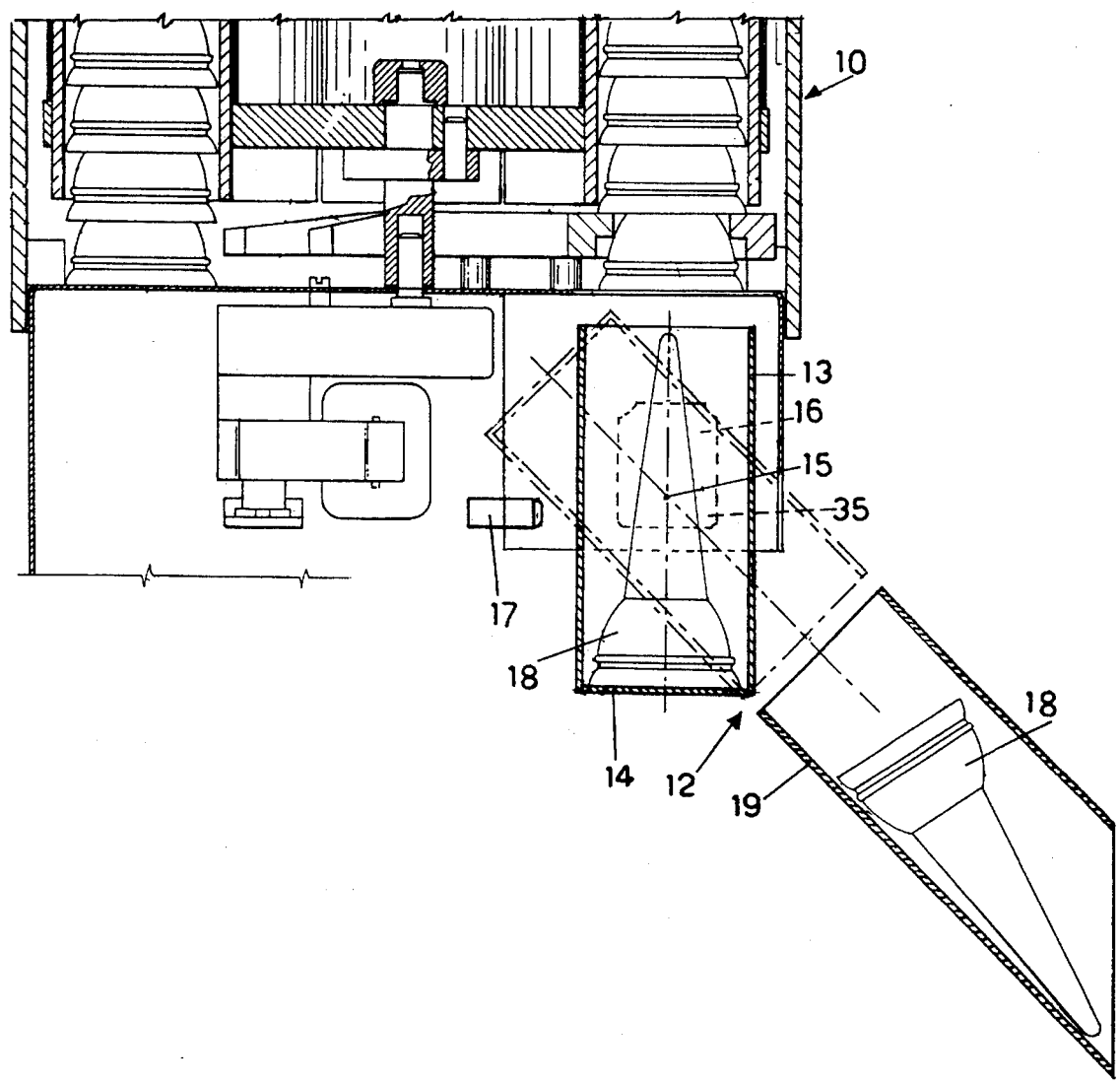
FIG. 1 is a vertical section showing the automatic device for feeding a cone to the ice cream machine.

In the drawings, the reference numeral 10 indicates overall a dispenser for cones of the like, which is preferable but not necessarily of the type described and illustrated in EP-A-379238, and reference numeral 11 indicates the dispensing station of an ice cream machine, which is preferably but not necessarily of the type described and illustrated in EP-330252.

The reference numeral 12 indicates overall a cone overturning and feeding device, which is positioned between the cone dispenser 10 and ice cream dispensing station 11.

The device 12 of the invention is formed structurally from a tubular container 13 closed at the end 14 and open at the opposite end.

The tubular container 13 is pivoted at pivot point 15 in a manner rotatable between a vertical position indicated in FIG. 1 by full lines, and an oblique position indicated in FIG. 1 by dashed lines.

The tubular container 13 is rotated by a suitable means, such as a geared motor indicated schematically as gear motor 16.

The reference numeral 17 indicates a photoelectric cell able to detect the presence of a cone 18 within the container 13.

Downstream of the tubular container 13 there is provided a chute 19, also tubular, which is aligned with the container 13 when this is in the dashed-line oblique position.

The chute 19 enables a cone 18 to fall by gravity into an annular seat 20 in the station 11.

Figure 2A:
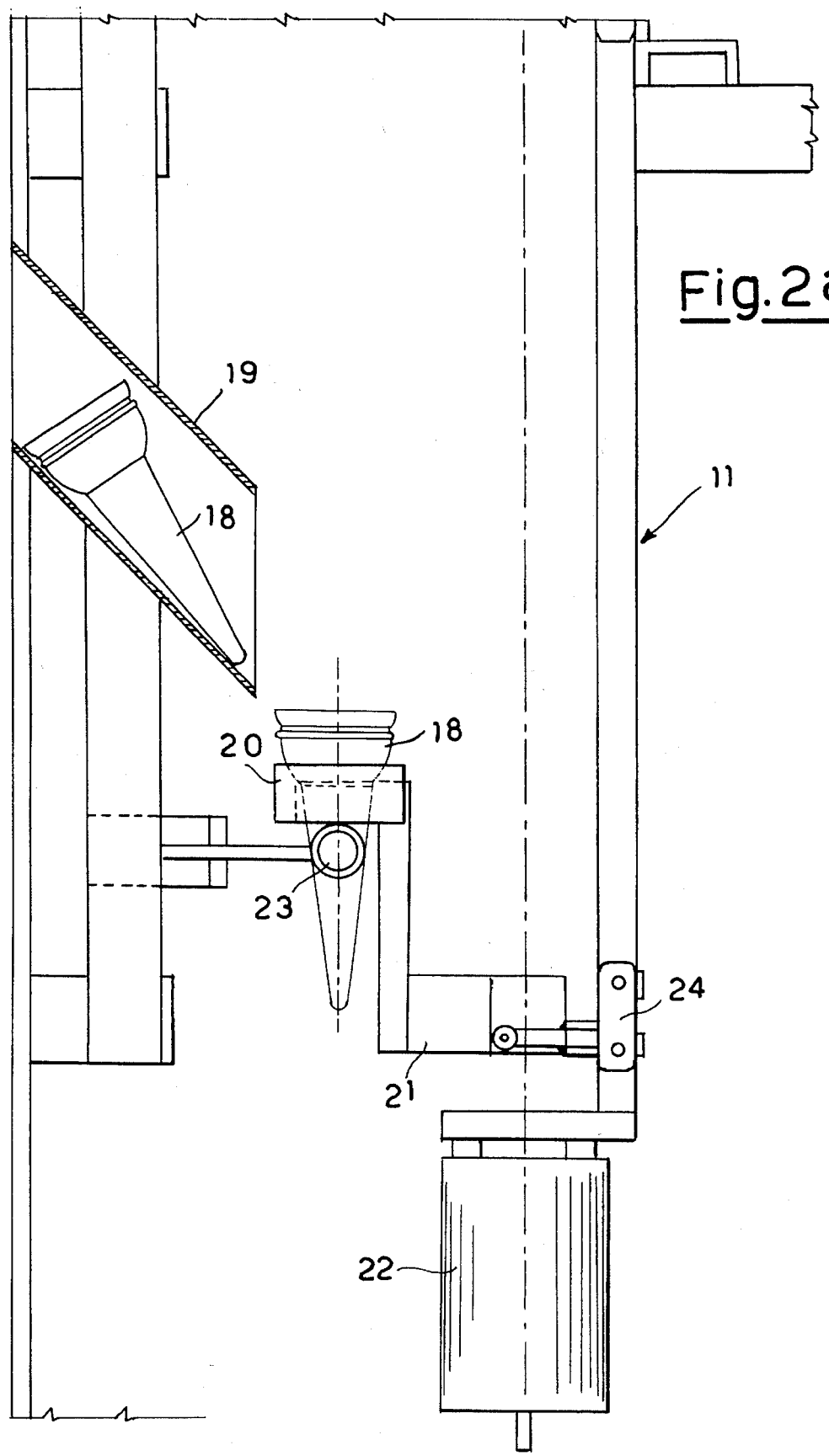

Said annular seat 20 is rigid with a carriage 21 driven by a geared motor 22 into the three positions indicated in FIGS. 2a and 2b by full lines, dashed lines and dashed and dotted lines, respectively.

The reference numeral 23 indicates a photoelectric cell able to detect the presence of a cone 18 in the seat 20. Reference numeral 24 indicates a limit microswitch for the lower position of the seat 20. Reference numeral 25 indicates a limit microswitch for the upper position of the seat 20, and reference numeral 26 indicates a microswitch determining the intermediate position of the seat 20, as described hereinafter.

The reference numeral 27 schematically indicates an ice cream delivery mouth or delivery head able to automatically deliver an ice cream portion into the cone 18 when in its upper position, shown by dashed lines in FIG. 2b, within the station 11, which is protected by a transparent door 28 opened and closed by vertical sliding under the control of a geared motor 29 via a linkage comprising a pinion 30 and rack 31.

The reference numerals 32 and 33 indicate two sensors for sensing when the door 28 is in its open and closed position, respectively, and reference numeral 34 indicates a photoelectric cell for sensing when the cone containing ice cream is in the intermediate withdrawal position indicated by the dashed and dotted lines.

The operation of the machine according to the present invention is clear from the aforegoing description with reference to the figures, and is briefly described as follows.

A cone 18, in the inverted position, is discharged by gravity in a known or conventional manner by the cone dispenser 10 into the tubular container 13, which is in the vertical position, indicated by full lines in FIG. 1.

The photoelectric cell 17 detects the presence of the cone in the container 13 and operates the geared motor 16, which rotates the container 13 into the dashed-line oblique position aligned with the tubular chute 19, and determined by a microswitch 35.

With the tubular container 13 in this oblique position, the cone 18 has been overturned, and is discharged by gravity into the chute 19 which conveys it into the ring 20 in an upright position, as shown in FIG. 2a.

When in this position, the photoelectric cell 23 detects the presence of the cone and operates the geared motor 22 which moves the cone into the upright position, indicated by dashed lines in FIG. 2b, whereat it lies in correspondence with the ice cream delivery mouth 27. This position is determined by the limit microswitch 25.

The required portion of ice cream is delivered through the mouth 27, after which the geared motor 22 is operated to move the cone 20 into the intermediate position, indicated by dashed and dotted lines in FIG. 2b, and determined by the microswitch 26.

With the cone 18 in this position the geared motor 29 is operated to raise the protection door 28, its open position being determined by the sensor 32.

The customer can then comfortably remove the cone containing ice cream by withdrawing it from the annular seat 20.

The photoelectric cell 34 senses the customer's action, so that the protection door 28 descends until it closes in a position determined by the photoelectric cell 33.

The geared motor 22 returns the annular seat 20 to its lower position shown in FIG. 2a, determined by the limit microswitch 24, and the geared motor 16 repositions the tubular container 13 in the vertical position aligned with the discharge mouth of the cone dispenser 10, through which the next cone 18 will be released.

The operating cycle involved in dispensing a portion of ice cream is thus completed fully automatically, and the system is ready for the next cycle.

The operating cycle is controlled by a microprocessor associated with an electronic circuit, which is not shown here in detail as it is within the capacity of an expert of the art.

The object stated in the introduction to the description is thus achieved, i.e., providing a machine able to operate completely automatically, the customer being required only to insert the coin or token, and to remove the cone containing ice cream.

We claim:

1. An automatic apparatus for dispensing an ice cream portion, said apparatus comprising an ice cream cone dispenser for dispensing cones in an inverted position, and a seat for receiving a cone in an upright position and for conveying said cone to an ice cream delivery mouth, a cone overturning and feeding device for receiving a cone in an inverted position, and for overturning said cone into an upright position and for feeding the overturned cone automatically into said seat, said cone overturning and feeding device being operably positioned between said cone dispenser and said seat.

2. An automatic apparatus for dispensing an ice cream portion, said apparatus comprising a cone dispenser for dispensing cones in an inverted position, a seat for receiving a cone in an upright position and for conveying the upright cone to an ice cream delivery mouth, and a cone overturning and feeding device for receiving a cone in an inverted position and for overturning said cone into an upright position and for feeding the overturned cone automatically into said seat, said cone overturning and feeding device being operably positioned between said cone dispenser and said seat, wherein said seat is adapted to be shifted in sequence into a first lower position for receiving the cone, a second upper position for filling the cone with an ice cream portion, and a third intermediate position for serving the cone containing ice cream to a customer.

3. An apparatus as claimed in claim 2, comprising an automatically openable and closable protection door for protecting the cone when seated in said seat in said second upper position and in said third intermediate position.

4. An automatic apparatus for dispensing an ice cream portion, said apparatus comprising a cone dispenser for dispensing cones in an inverted position, a seat for receiving a cone in an upright position and for conveying the upright cone to an ice cream delivery mouth, and a cone overturning and feeding device for receiving a cone in an inverted position and for overturning said cone into an upright position and for feeding the overturned cone automatically into said seat, said cone overturning and feeding device being operably positioned between said cone dispenser and said seat, wherein said cone overturning and feed device comprises a tubular container closed at one end and open at an opposite end, said tubular container being rotatable between a first vertical position into which the cone falls by gravity in an inverted position from said cone dispenser and a second oblique position in which the overturned cone is discharged by gravity into a chute for feeding the cone in an upright position into said seat.

* * * * *